United States Patent
Simpkinson et al.

(10) Patent No.: US 11,282,282 B2
(45) Date of Patent: Mar. 22, 2022

(54) VIRTUAL AND PHYSICAL REALITY INTEGRATION

(71) Applicant: Vulcan Inc., Seattle, WA (US)

(72) Inventors: Richard Earl Simpkinson, Issaquah, WA (US); Omer Rosenbaum, Kirkland, WA (US)

(73) Assignee: Vulcan Inc., Seattle, WA (US)

( * ) Notice: Subject to any disclaimer, the term of this patent is extended or adjusted under 35 U.S.C. 154(b) by 0 days.

(21) Appl. No.: 16/714,529

(22) Filed: Dec. 13, 2019

(65) Prior Publication Data

US 2020/0193711 A1 Jun. 18, 2020

Related U.S. Application Data

(60) Provisional application No. 62/780,161, filed on Dec. 14, 2018.

(51) Int. Cl.
*G06T 19/00* (2011.01)

(52) U.S. Cl.
CPC .................................. *G06T 19/006* (2013.01)

(58) Field of Classification Search
CPC .................................................... G06T 19/006
See application file for complete search history.

(56) References Cited

U.S. PATENT DOCUMENTS

| | | | | |
|---|---|---|---|---|
| 9,348,141 B2* | 5/2016 | Bar-Zeev | ................. | G06F 3/013 |
| 9,588,408 B1* | 3/2017 | Linnell | ................ | H04N 9/3188 |
| 10,751,592 B1* | 8/2020 | Roberts | .............. | G06K 9/00597 |
| 2005/0062939 A1* | 3/2005 | Tamura | ................ | G03B 21/145 |
| | | | | 353/69 |
| 2010/0306685 A1 | 12/2010 | Giaimo, III et al. | | |
| 2011/0025689 A1 | 2/2011 | Perez et al. | | |
| 2013/0117377 A1* | 5/2013 | Miller | ..................... | A63F 13/35 |
| | | | | 709/205 |
| 2014/0306866 A1* | 10/2014 | Miller | ....................... | G06T 1/20 |
| | | | | 345/8 |
| 2016/0026242 A1* | 1/2016 | Burns | .................. | G02B 27/017 |
| | | | | 345/633 |
| 2019/0287310 A1* | 9/2019 | Kopeinigg | ............. | G06Q 50/01 |

OTHER PUBLICATIONS

International Search Report and Written Opinion dated Jun. 25, 2020, Patent Application No. PCT/US2019/066395, 18 pages.
PCT Invitation to Pay Additional Fees and, Where Applicable, Protest Fee mailed Mar. 23, 2020, Patent Application No. PCT/US2019/066395, 12 pages.

* cited by examiner

*Primary Examiner* — Ryan R Yang
(74) *Attorney, Agent, or Firm* — Davis Wright Tremaine LLP

(57) ABSTRACT

A system for providing a virtual reality experience obtains, from a first sensor, image data of a first subject upon entry to an area. The system obtains pose information for the first subject during a period in which the subject is within the area. A graphical asset is generated from the image data. A skeletal model is maintained based on the pose information. A virtual reality scene is generated, using the asset and skeletal model, from the perspective of a second subject.

27 Claims, 10 Drawing Sheets

VIRTUAL AND PHYSICAL REALITY INTEGRATION

CROSS-REFERENCE TO RELATED APPLICATIONS

This application claims the benefit of U.S. Provisional Patent Application No. 62/780,161, filed Dec. 14, 2018, the disclosure of which is herein incorporated by reference in its entirety.

BACKGROUND

A virtual reality experience is an interactive, computer-generated experience combining computer-generated video with a variety of additional sensory feedback. Today, typical virtual reality experiences are provided via equipment such as virtual reality headsets, force feedback gloves, and other devices. Although these devices can provide rich experiences to their users, they are not, by themselves, well adapted to shared experiences.

BRIEF DESCRIPTION OF THE DRAWINGS

Various techniques will be described with reference to the drawings, in which.

DETAILED DESCRIPTION

Techniques and systems described below relate to the provision of a shared virtual reality experience. In particular, the disclosed techniques and system relate to the provision of a virtual reality experience in a virtual reality room shared by multiple participants. The users may view each other as they move about and interact with the virtual environment. The realism of the effect is enhanced by techniques to generate an accurate, real-time representation of each participant, without cumbersome or unwanted virtual reality equipment being included in the virtual reality scene viewed by the participants, even if such equipment is used in physical reality.

In at least one embodiment, a system comprises a virtual reality room, computing devices, and sensors. A first sensor collects detailed, three-dimensional scans of a subject, and a second sensor collects skeletal model data in real time. The former provides detailed textures and surfaces, and the latter provides information describing a participant's current location and posture. Using this information, a realistic animation of the participant can be generated and included in a virtual reality scene. The realism is further enhanced, in at least one embodiment, by animation of the participant's facial movements, such as those that occur during speech.

In at least one embodiment, an enhanced augmented reality experience is provided, in which a participant's experience is enhanced by the projection of supplementary content onto surfaces within an augmented reality room. In at least one embodiment, the augmented reality room is configured similarly to the virtual reality room just described. A pose of the participant is tracked, including gaze information. An image is projected onto a surface located at the intersection between the participant's gaze and the surface. The image is adjusted according to the angle of the intersection. In at least one embodiment, the image is an extension of an augmented reality scene. The augmented reality scene is viewed through a device, such as a pair of augmented reality glasses, while the projected image is visible in the participant's peripheral vision outside of the edges of the glasses.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the fields of augmented and virtual reality, by providing, in some cases and embodiments, increased levels of realism in virtual and augmented reality experiences.

Figure 1:
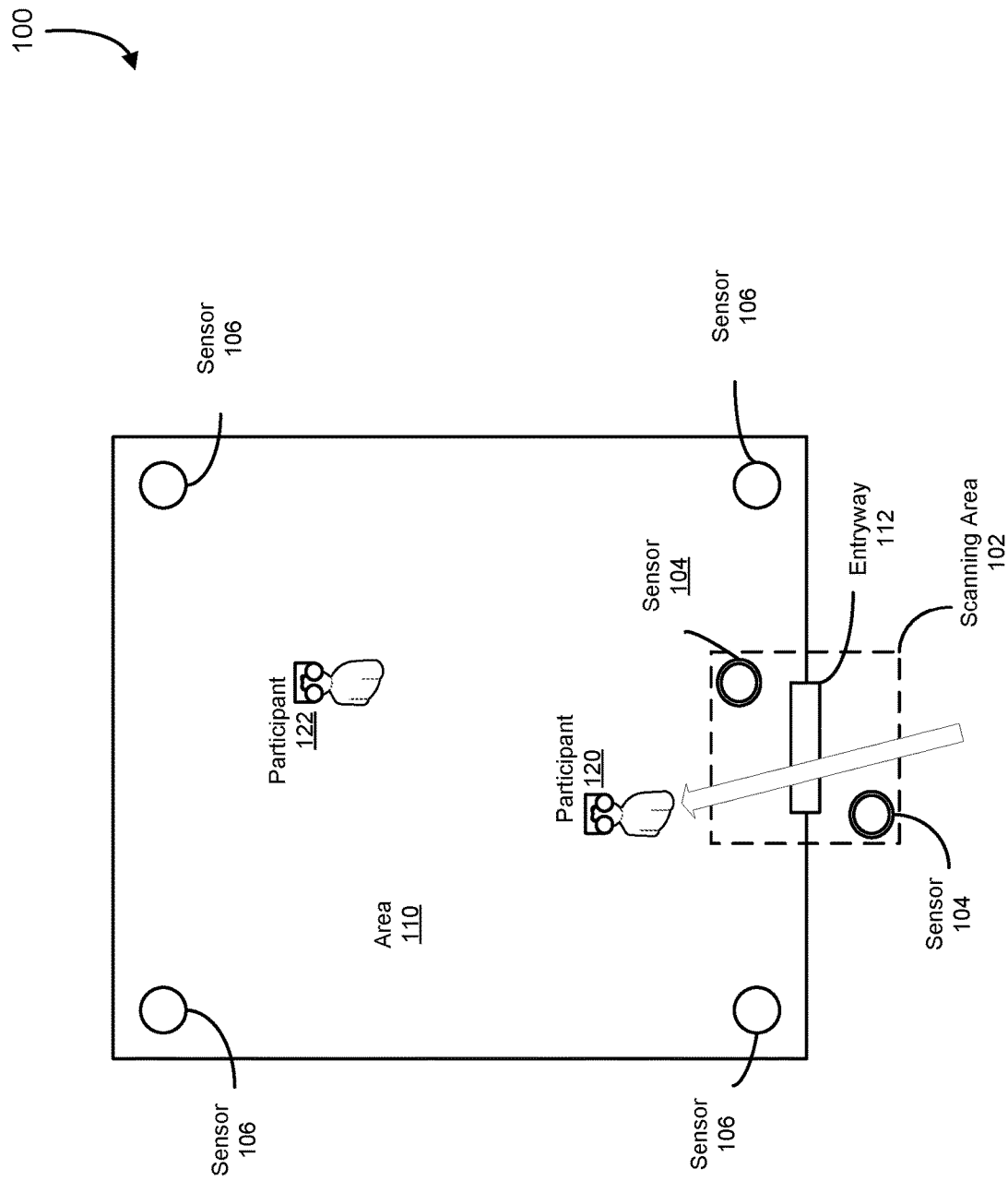
FIG. 1 illustrates an example of a virtual reality room, in accordance with an embodiment.

FIG. 1 illustrates an example of a virtual reality room, in accordance with an embodiment. As depicted in FIG. 1, a virtual reality room 100 can comprise an entryway 112 and an area 110 comprising portions of the room that are not the entryway 112.

Note that a virtual reality room, as referred to herein, may not necessarily be an enclosed space. In some embodiments, the room 100 may be an area without walls or other barriers. Likewise, the entryway 112 may not be a distinct area demarcated by walls or other barriers. Generally speaking, the boundaries of the entryway 112 a room 100 may be defined according to the perceptive capabilities of sensors installed in the respective areas. For example, sensors 106 may track movement and pose information within room 100, and as such the boundaries of the room 100 may be defined, in at least one embodiment, according to the effective range of the sensors 106 that track movement and pose information.

As depicted in FIG. 1, a virtual reality room comprises an entryway 112 in which one or more sensors 104 are located. The entryway sensors 104, in at least one embodiment, are high-fidelity three dimensional scanners. The sensors 104 capture detailed, three-dimensional data by observing participants 120, 122 as they enter the virtual reality room 100 via the entryway 112 and pass through a scanning area 102. Examples of such data collected by the sensors 104 includes three-dimensional scans of a participant 120, three-dimensional scans of a participant's face, textural data representative of a participant's hair or clothing, and so on. Note that, in various embodiments, the participants 120, 122 put on any virtual reality equipment, such as goggles or force-feedback devices, after the scanning has completed. This may be done, for example, to ensure that an unobstructed view of each participant's face is recorded.

The virtual room further comprises one or more additional sensors 106. The additional sensors 106, in an embodiment, have relatively low fidelity but are high speed, and moreover are capable of capturing skeletal modeling data of the participants as they move about the room 100. Here, skeletal modeling data refers to data that can be used to form or update a skeletal model of each participant. A skeletal model may sometimes be referred to as a kinematic skeletal model, and may also be described as a "stick figure" model. In at least one embodiment, the model comprises representations of major joints and bones of an anatomy. The joint and bone representations can be mathematically manipulated to represent a participant's posture. For example, the bones of the model can be mathematically rotated or otherwise positioned in space, subject to constraints imposed by the joints, to represent a realistic human pose. A skeletal model may be updated according to data collected from one of the sensors 106 to represent a participant's current pose. Regarding the sensors 106, they may be of any type, or combination of types, suitable for such tracking, such as various depth-sensing cameras, three-dimensional cameras, infrared sensors, arrays of two-dimensional cameras, and so on. In at least one embodiment, sensors 106 are supplemented by additional sensors for capturing specific types of movements, such as mouth or jaw movements. For example, a participant's pose might be tracked primarily based on data from the sensors 106, but facial movements might be tracked by one or more sensors worn by the participant.

Figure 2:
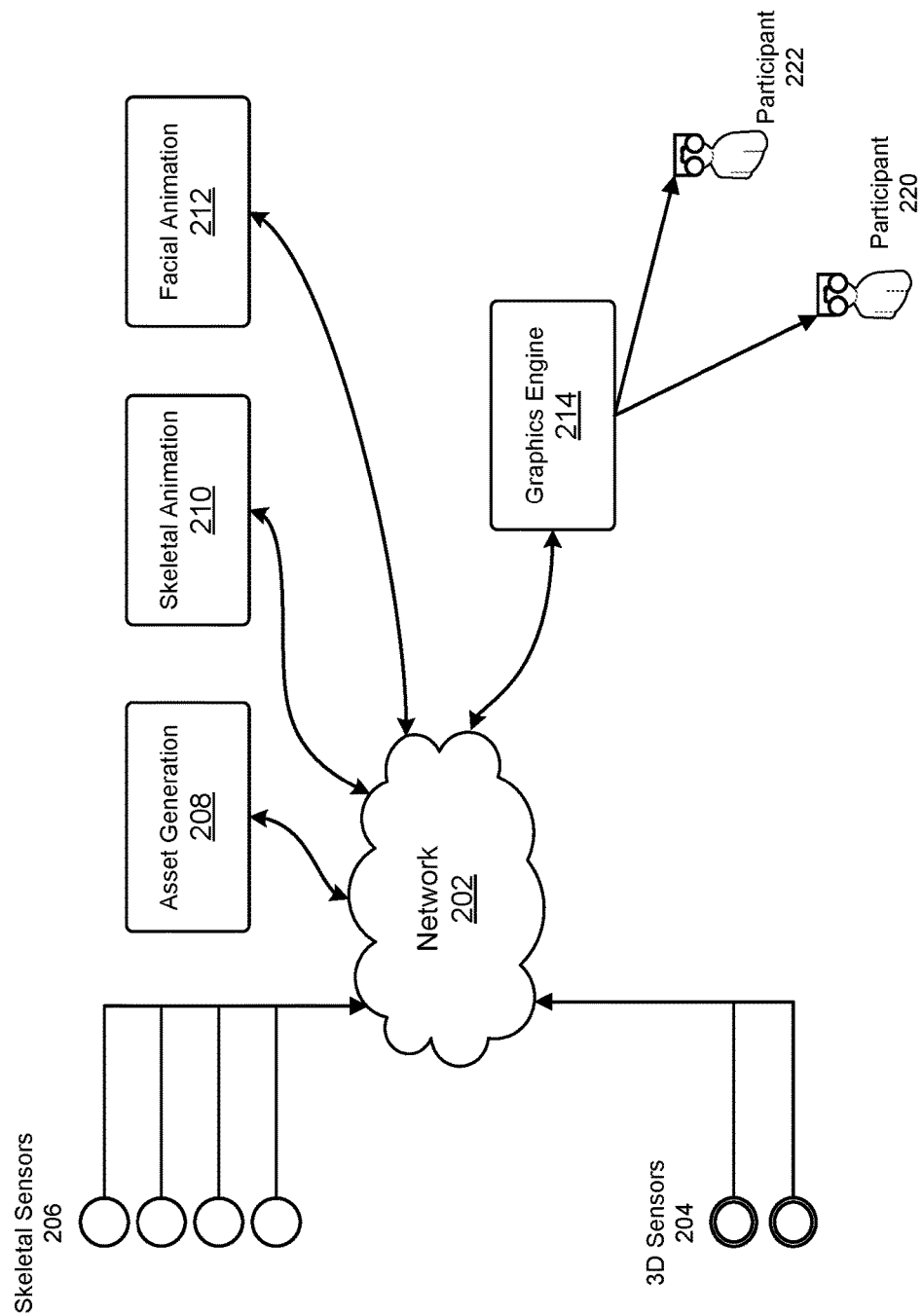
FIG. 2 illustrates an example virtual reality system, in accordance with an embodiment.

An example virtual reality system, such as the virtual reality system 200 depicted in FIG. 2, uses the scanned three-dimensional data and the skeletal modeling data to enhance the virtual reality experience of the participants 220, 222. For example, the participants 220, 222 may be wearing virtual reality devices such as goggles, force feedback gloves, and so on. The participants 220, 222 may also which to view each within the virtual reality scene, and wish that the representations of the participants be realistic. For example, the participants may wish that their representations reflect current positions, postures, and so forth. The realism of the experience may be reduced, however, by the inclusion of the virtual reality equipment in these representations. This may be particularly true for facial features, since the participants may be wearing goggles or other equipment.

In at least one embodiment, the virtual reality system 200 uses the scanned three-dimensional data and the skeletal modeling data to enhance the virtual reality experience, by generating an animated version of each participant. The skeletal modeling data is used to generate an animation that accurately represents a participant's current position and posture. The scanned three-dimensional data, meanwhile, is used to enhance the realism of the animation by accurately representing a participant's appearance. The rendered graphics may exclude representations of virtual reality equipment worn by a participant, since the inclusion of such equipment might detract from the realism of the virtual reality experience.

Note that although FIG. 1 is described in relation to virtual reality, the inclusion of the participant representations may be described as providing a form of augmented reality, or an experience comprising a mix of virtual and augmented reality.

FIG. 2 illustrates the example virtual reality system 200, in accordance with an embodiment. FIG. 2 depicts various components, some of which may comprise software modules. In at least one embodiment, a software module, sometimes referred to as a module, comprises processor-executable instructions that execute on a computing device, such as one of the computing devices depicted in FIG. 10. The software module may also comprise a non-transitory memory device, onto which at least a portion of the instructions are loaded for execution by at least one processor of the computing device.

The example virtual reality system 200 comprises a set of 3D sensors 204, which may correspond to the sensors 104 depicted in the entryway of the virtual reality room of FIG. 1, or to other 3D sensors positioned to collect 3D scans of a participant prior to that participant's donning of virtual reality equipment. The information may, in some cases, be saved for use with subsequent virtual reality sessions. Note, however, that there may be advantages to having current scans. For example, a participant may have changed outfits since the time a prior scan was made, or changed their hairstyle. Current scans may therefore allow representations to better reflect the participant's appearance at the time the virtual reality experience is taking place.

The example virtual reality system 200 comprises one or more skeletal sensors 206, which may correspond to the sensors 106 distributed in a virtual reality room 100, as depicted in FIG. 1. These sensors 206 collect real-time skeletal modeling information, which as indicated above comprises information sufficient to maintain a stick-figure representation of a participant's current position and posture.

Information from the 3D sensors 204 and skeletal sensors 206 is sent, via a network 202, to one or more of the software modules of the example virtual reality system 200. In some embodiments, the information from the 3D sensors 204 is stored on a storage device and recalled when needed. For example, the information might be stored on a local memory, such as a solid state or random-access memory of a computing device, or the information might be stored remotely, by a storage service accessed via the Internet.

In an embodiment, a skeletal animation module 210 receives skeletal modeling information from the skeletal sensors 206 and generates an animation of a participant. The animation may be based partly on a skeletal model of the participant. The model may be structured to allow it to be updated to create an animated version of the participant's real movements.

In an embodiment, an asset generation module 208 generates graphical assets and supplies the graphical assets to the skeletal animation module 210 and/or graphics engine 214. The assets may be obtained through a variety of sources, but at least some derived from data captured by the 3D sensors 204. These assets may include clothing color, clothing texture, hair color, hair texture, and so forth.

In an embodiment, a facial animation module 212 assists in the rendering an animation of a participants facial features, expressions, and movements. The animation may be based partly on graphical assets created from data captured by the 3D sensors 204. For example, the information captured by the 3D sensors 204 might be used to create a wire frame model of a participant's face, and to create accurate textures and colors for mapping onto the wire frame model. The facial animation module 212 may also utilize data provided by the skeletal sensors 206 and/or skeletal animation module 210 regarding the current position and posture of the participant, such as information regarding the participant's orientation or gaze direction. The sensors may also be capable of providing information about the participant's mouth and jaw movements, facial expression, gaze direction, and so forth. Additional information may also, in at least one embodiment, be provided from other sources, such as from a virtual reality device worn by the participant. In at least one embodiment, movements of facial muscles are detected by a device worn by the participant.

The facial animation module 212 can also be provided with information related to a participant's speech. In at least one embodiment, speech information is used to generate an animation of the participant's face. The speech information may include audio data, transcripts, phonemes, and so forth. This information can then be used by the model 212 to animate the participant's face, such that the animation is synchronized with the participant's speech.

In at least one embodiment, a graphics engine 214 renders a representation of the participant. This may comprise combining a rendering of a skeletal model state with a graphical asset generated from data collected by the 3D sensors 204. In at least one embodiment, a rendering of a skeletal model state is combined with a rendering of a facial animation model state. The combined rendering may therefore incorporate a participant's posture, facial expressions, mouth movements, and so forth.

In at least one embodiment, the graphics engine 214 functions according to a graphics pipeline that receives and combines input from the skeletal animation module 210, the facial animation module 212, and the asset generation module 208. A representation of the participant is generated, by the graphics engine 214, based at least in part on the combination.

After rendering, the graphics engine 214 may (directly or indirectly) supply rendered frames for display to the participants 220, 222, via those participant's virtual reality devices.

Figure 3:
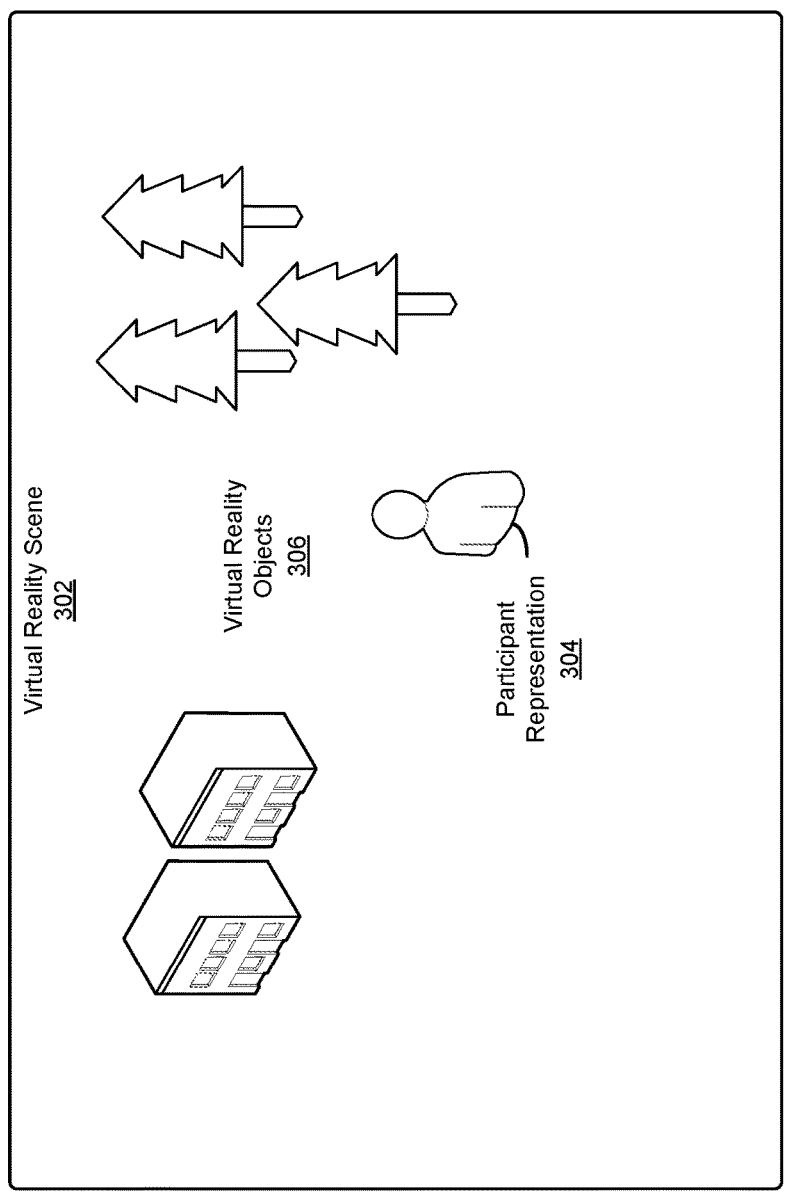
FIG. 3 illustrates an example of a virtual reality scene, in accordance with an embodiment.

FIG. 3 illustrates an example 300 of a virtual reality scene, as might be rendered by the systems described in FIGS. 1 and 2, in accordance with an embodiment.

In an embodiment, a virtual reality scene 302 is generated by a virtual reality device worn by a participant in a shared virtual reality experience. As explained above, participants in the virtual reality experience may be located with a virtual reality room as depicted in FIG. 1, and may be wearing virtual reality equipment that would, if displayed within the virtual reality scene 302, detract from the realism of the shared experience.

The virtual reality system 200 depicted in FIG. 2 may therefore generate, within the virtual reality scene 302, a participant representation 304. The participant representation 304, in at least one embodiment, is a generated version of a participant in the virtual reality experience. For example, if a participant A is wearing a virtual reality headset generating the virtual reality scene 302, and looking at a location within the experience in which participant B is presently located, the virtual reality scene 302 is generated by the system 200 to include a representation 304 of participant B. The representation may, in some sense, be described as an augmented reality version of the participant, because it may be based at least partly on a real-time representation of the participant, as well as on detailed 3D scans of the participant. The augmentation aspect of this description can be described as coming from the removal, in the generated image, of virtual reality equipment that would otherwise detract from the experience. In some instances, however, the augmentation may relate to other features, such as altering the representation 304 to include a costume or equipment appropriate to the virtual reality experience. Also note that the participant representation 304 is distinguished from a conventional computer-generated avatar at least because it is based on a combination of scanned three-dimensional data and real-time skeletal data obtained through the process described in relation to FIG. 1.

Figure 4:
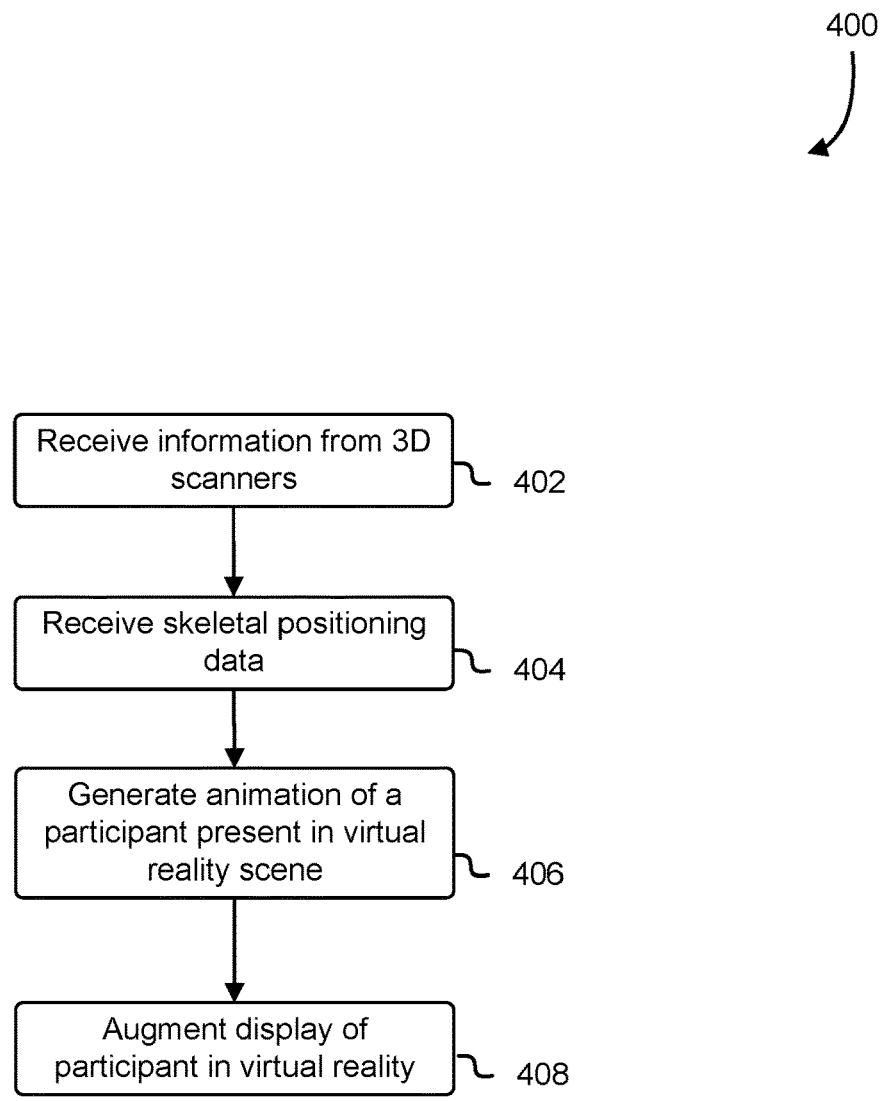
FIG. 4 is a flow diagram that illustrates an example process for generating a virtual reality scene, in accordance with an embodiment.

This process may be further understood in view of FIG. 4, which is a flow diagram that illustrates an example process for generating a virtual reality scene, in accordance with an embodiment. Some or all of the process 400 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). These computer systems may individually or collectively implement a virtual reality system, such as the virtual reality system 200 that is depicted in FIG. 2.

At 402, a virtual reality system receives information from the three dimensional sensors 104 depicted in FIG. 1.

In at least one embodiment, the received information comprises a three dimensional representation of a participant's face. For example, the received information may comprise a point cloud, or similar data, indicating the contours of the participant's facial features. In another example, the received information comprises facial identity metrics, such as various numerical values that are representative of various appearance characteristics.

In at least one embodiment, the received information comprises an image with depth information.

In at least one embodiment, the received information comprises textural data, such as data representing clothing, hair, and so forth.

In at least one embodiment, the 3D sensors 104 operate in a four-dimensional mode to collect data over time. This information may assist in the generation of a skeletal model, or be used for other animation purposes. In at least one embodiment, data captured by the 3D sensors 104 includes motion data. In at least one embodiment, the motion data is used to identify joint locations for placement on a skeletal model. The skeletal model can be initialized using this information, and then updated via skeletal positioning information obtained from other sensors.

In at least one embodiment, the effect of wind in the environment is captured. For example, wind in the environment may alter the appearance of a participant's hair, but if captured over time, deviations in appearance caused by the wind can be identified. This information can then be used to enhance the participant's representation, e.g. by using a "normal" representation of the participant's hairstyle.

At 404, the virtual reality system receives skeletal positioning data from the sensors 106 depicted in FIG. 1.

In at least one embodiment, the skeletal positioning data indicates the location of the participant within a virtual reality room, such as the virtual reality room 100 that is depicted in FIG. 1.

In at least one embodiment, the skeletal positioning data indicates the participant's pose, which can include the position and orientation of the participant, and may also include the position and orientation of the participant's arms, hands, legs, feet, and torso. The skeletal model can be updated, over time, based on the pose information received from the sensors 106. In an embodiment, this information is periodically obtained, updated, and distributed to other system components with a frequency sufficient to maintain a desired frame rate. In some embodiments, e.g., when the rate at which the sensor data can be collected relative to the frame rate, the skeletal model may be used to interpolate movement for frames that would otherwise be delayed due to the frequency with which the sensors can capture data.

In an embodiment, the skeletal positioning data includes enhanced information pertaining to a participants face, such as information indicative of jaw or mouth movement. For example, audio data can be provided to the facial animation components of the virtual reality system, and used to enhance animation of a participant's face by synchronizing mouth movements with spoken words.

At 406, the virtual reality system generates an animation of a participant for inclusion in a virtual reality scene. The system may, for example, determine that a participant B is within the field of view of participant A, based on the participants' respective locations within the virtual reality environment, and based on participant A's gaze angle.

In at least one embodiment, the animation of participant B generated based on the skeletal model and one or more graphical assets derived from the 3D scan information. For example, a graphical asset based on a 3D scan of a participant's hair can be added combined with a representation based on the skeletal model. Likewise, a graphical asset for the participant's face can be generated using a facial animation model constructed, at least in part, from a 3D scan of the participant's face.

At 408, the animation is incorporated into a virtual reality scene. For example, the animation of B may be incorporated into a scene viewed by participant A. The virtual reality scene may comprise a variety of other elements, such as various virtual reality objects. FIG. 3, for example, depicts a virtual reality scene 302 comprising a participant representation 304 and other various virtual reality objects 306.

Figure 5:
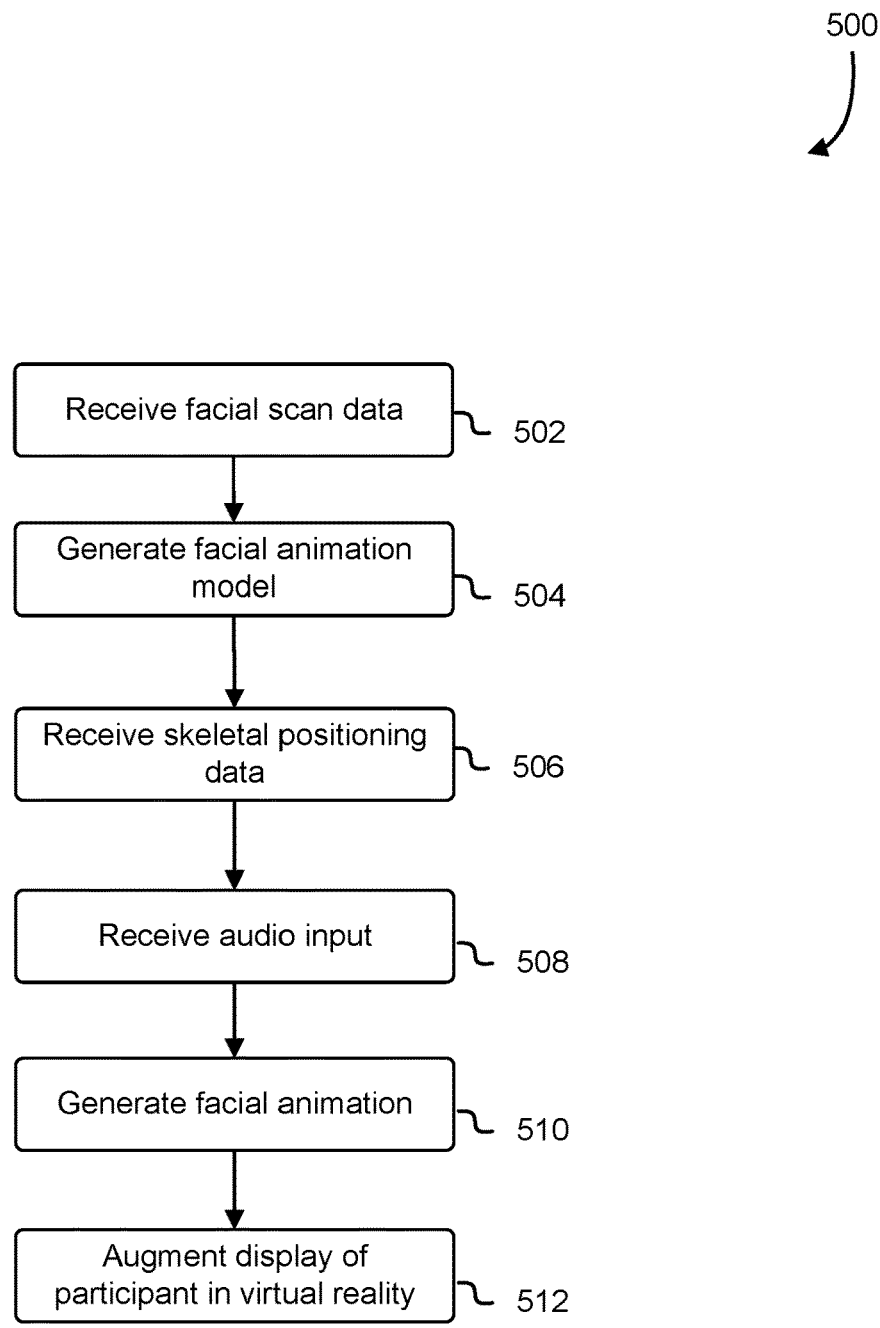
FIG. 5 is a flow diagram that illustrates an example process for generating a representation of a participant's face for inclusion in a virtual reality scene, in accordance with an embodiment.

As noted above, the animation of a participant may include a representation of a participant's face. FIG. 5 is a flow diagram that illustrates an example process for generating a representation of a participant's face for inclusion in a virtual reality scene, in accordance with an embodiment. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). These computer systems may individually or collectively implement a virtual reality system, such as the virtual reality system 200 that is depicted in FIG. 2.

At 502, the system receives facial scan data. The 3D sensors of the system may collect detailed three-dimensional representations of a participant's facial features. As described in relation to FIG. 1, this information may be obtained in an entryway area, prior to the participant's donning of virtual reality equipment such as headset or goggles.

At 504, the system generates a facial animation model. The model is generated using the facial scan data. Various techniques may be employed, individually or in combination. These may include, for example, motion capture, morph target identification, construction of wireframe or mesh models, skeletal models, physiological models, and so forth.

At 506, the system receives current skeletal positioning data. This may include data regarding the current orientation, posture, and position of the participant. The data may be expressed as a skeletal or stick figure model, or using some other modelling technique, such as physiological models, wireframe models, and so forth.

At 508, the system receives audio input. Various audio-driven models may be used as input to the animation process. Then, at 510, the audio input is combined with the skeletal data received from the skeletal sensors, or from other sensors positioned in the virtual reality room 100 or on a device worn by a participant. Based on various combinations of this data, the system generates an animation of the participant's face.

At 512, the system augments the representation of the participant within a virtual reality scene. For example, the system may generate a representation of participant B when he or she is within the field of view of participant A, based on the two parties respective locations within the virtual reality environment.

In an example embodiment, a computer-implemented method performs operations to enhance provision of a virtual reality experience. In this example embodiment, the operations comprise generating a graphical asset based at least in part on image data of a first subject, the image data obtained by a first sensor; maintaining a skeletal model of the first subject based at least in part on pose information, the pose information obtained by a second sensor; and generating a virtual reality scene comprising a representation of the first subject, the representation generated based at least in part on the skeletal model and the graphical asset.

In at least one embodiment, the first sensor corresponds to one of the sensors 104 in an entryway 112 or scanning area 102, as depicted in FIG. 1. In at least one embodiment, the first sensor obtains image data prior to the commencement of a virtual reality experience. Commencement of the experience may correspond to the initiating of skeletal tracking by other sensors, and/or the generation of virtual reality scenes for display to one or more participants or observers. In at least one embodiment, the second sensor corresponds to sensors 106 in the virtual reality room 100, as depicted in FIG. 1.

In at least one embodiment, the graphical asset is representative of a portion of the first subject over which equipment is worn by the first subject. For example, the graphical asset may represent some or all of the participant's face. The graphical asset may then be used to generate a representation of the participant's face in which virtual reality goggles, worn by the participant during a virtual reality experience, are removed.

In at least one embodiment, the example computer-implemented method further comprises maintaining a model of facial features of the first subject; and generating the representation of the first subject based at least in part on a current state of the model of facial features. The model of facial features, in at least one embodiment, comprises a skeletal model specifically adapted to represent the face. This may, for example, include elements for modelling jaw positions, eye positions, facial musculature, and so forth.

In at least one embodiment, the graphical asset is adjusted using the model of facial features and incorporated into the representation of the first subject. For example, the graphical asset might be transformed based on a current state of the model of facial features, so that the resulting asset accurately reflects the participant's facial expression. In at least one embodiment, the graphical asset is mapped or applied to a mesh or wireframe model that reflects the current state of the model of facial features.

In at least one embodiment, the maintenance of the model of facial features is based at least in part on speech or other audio generated by the first subject. For example, the model of facial features may be updated so that it reflects the appropriate mouth and jaw positions, given a current phoneme. The model of facial features can also be updated based on pose information collected by second sensor.

In at least one embodiment, the graphical asset comprises an image of a subject's face. In another embodiment, the graphical asset comprises facial identity data, such as numerical metrics that are representative of facial appearance. In another embodiment, the graphical asset is a mesh or wireframe model.

Figure 6:
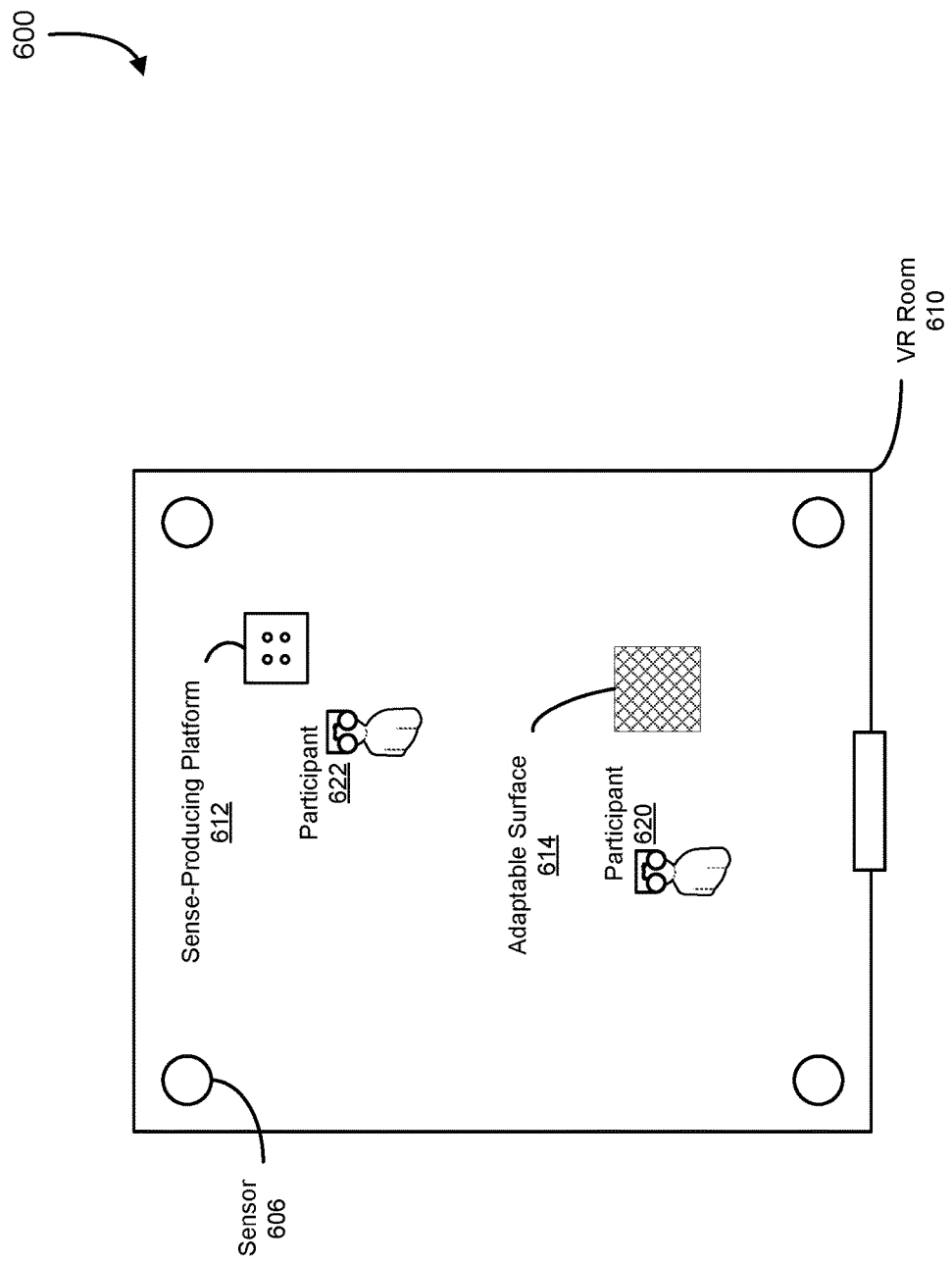
FIG. 6 illustrates an example of a virtual reality room with adaptable surfaces and sense-producing platforms, in accordance with an embodiment.

A virtual or augmented reality experience may also be include based on input from the skeletal sensors and various surfaces and platforms within the environment. FIG. 6 illustrates an example of a virtual or augmented reality room with adaptable surfaces and sense-producing platforms, in accordance with an embodiment. In the example 600, a VR Room 610 is occupied by participants 620, 622. The VR Room 610 is configured to have various sensors 606, which may be skeletal sensors such as those depicted in FIGS. 1 and 2.

In an embodiment, the VR Room 610 comprises a sense-producing platform 612. The platform may be stationary or mobile. In the former case, there may be a plurality of such platforms distributed about the VR Room 610. These may, for example, be mounted on the ceiling of the VR Room 610. In the latter case, a mobile platform may be automated to move about the room at the direction of the virtual reality system 200. In both cases, a platform 612 may be considered active when it is near a participant 622. The position of the platform 612 may be guided or determined by the system 200, based on location data provided by the sensors 606. The position may be further guided by position, posture, and orientation data provided by these sensors 606. For example, a platform for producing smells might be located in front of the participant somewhere near face-level, whereas a platform for producing a wind effect might be placed in a relation to the participant that is based on the desired direction of the simulated wind.

In an embodiment, the VR Room 610 contains an adaptable surface 614. The surface may be mobile or located throughout the room. Similar to the sense-producing platform 612, the active adaptable surface 614 can be driven by the location of the participant that is interacting with, or is likely to interact with, the adaptable surface 614.

The adaptable surface comprises a deformable surface whose shape and contour is computer-driven. For example, the system 200 might send three-dimensional data describing a surface (such as a staircase or hill) to the adaptable surface 614, causing the surface to form the indicated surface.

The preceding description has been primarily devoted to virtual reality, where most if not all elements of a scene or experience are generated by computer. In contrast, augmented reality relates to scenarios in which a participant views reality through a pair of glasses or other equipment, and that reality is enhanced (e.g., augmented) in some way. A participant's view of augmented reality is therefore a composite of various elements, including real elements and computer-generated elements.

Figure 7:
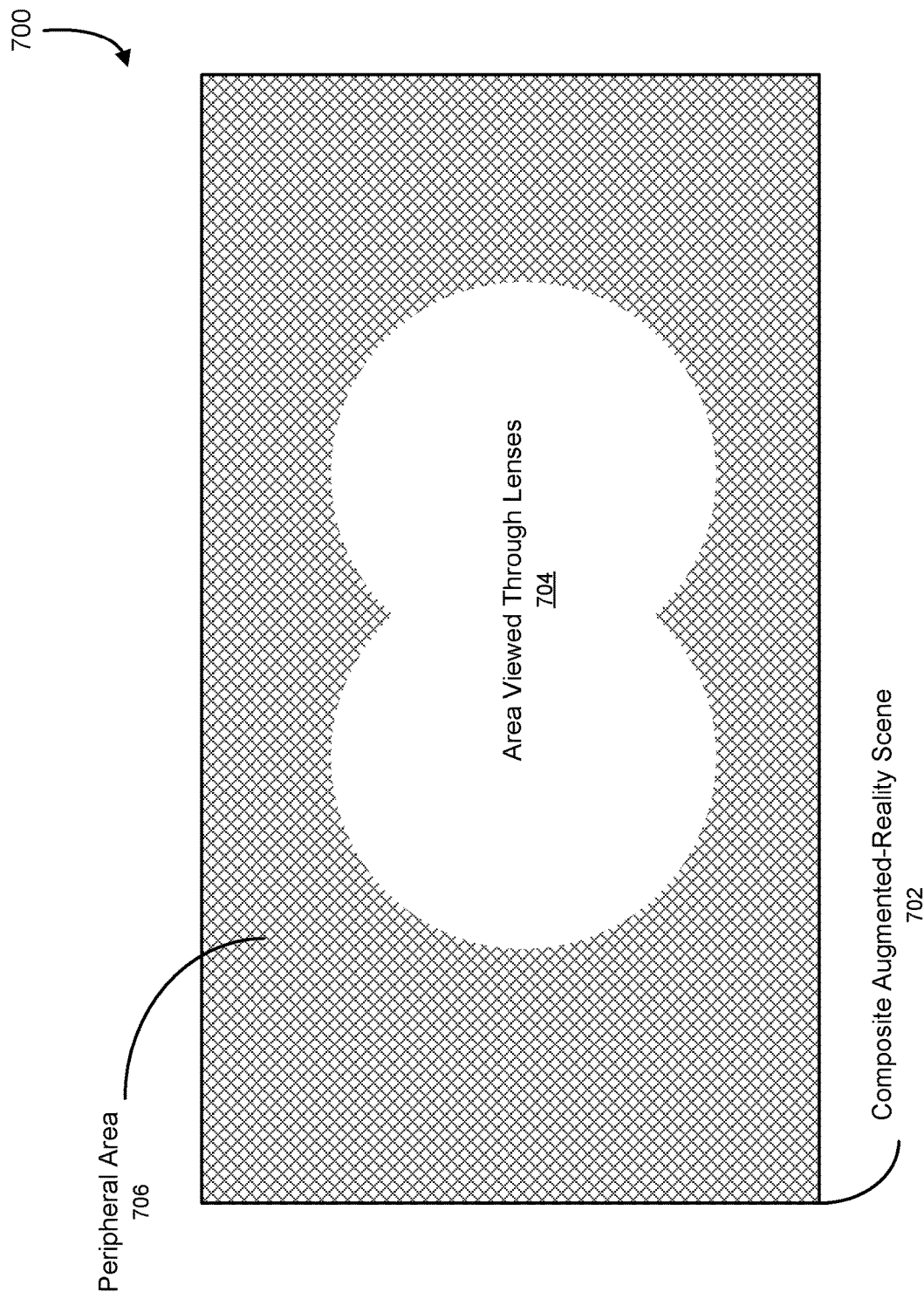
FIG. 7 is an example of a composite augmented reality scene, in accordance with an embodiment.

FIG. 7 is an example of a composite augmented reality scene, in accordance with an embodiment. In the example 700 of FIG. 7, a composite augmented-reality scene 702 includes an area viewed through lenses 704 of an augmented reality-device. This area 704 can comprise physical objects seen through the lenses of an augmented reality-device, as well as computer-generated elements projected onto the lenses.

The composite augmented-reality scene may further include a peripheral area 706. This area 706 comprises those parts of a user's field of view which are outside of the edges of the lenses, and therefore not seen through the lenses. Typically, this area is primarily seen through the user's peripheral vision.

Figure 8:
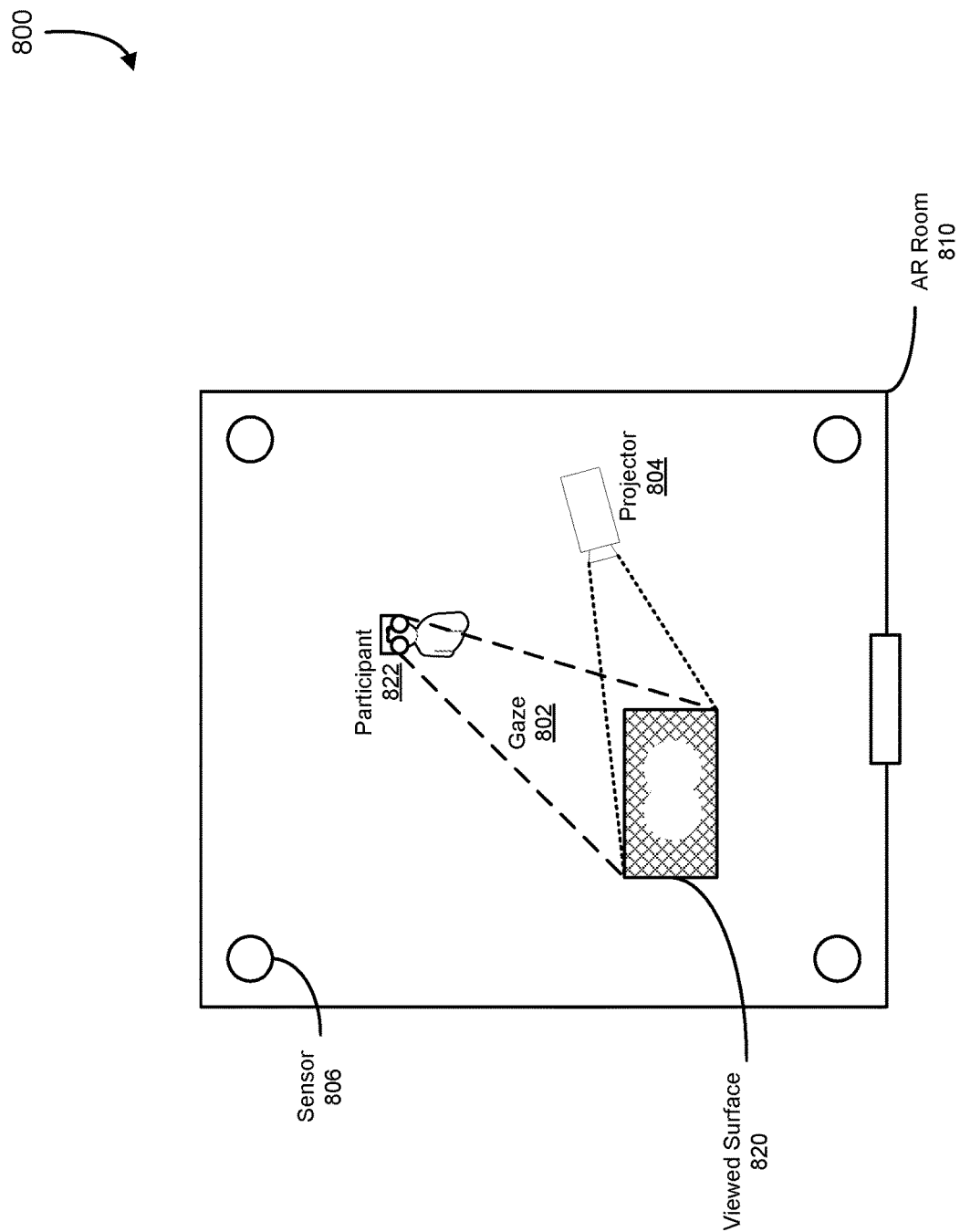
FIG. 8 illustrates an example room for augmented reality, in accordance with an embodiment.
Figure 9:
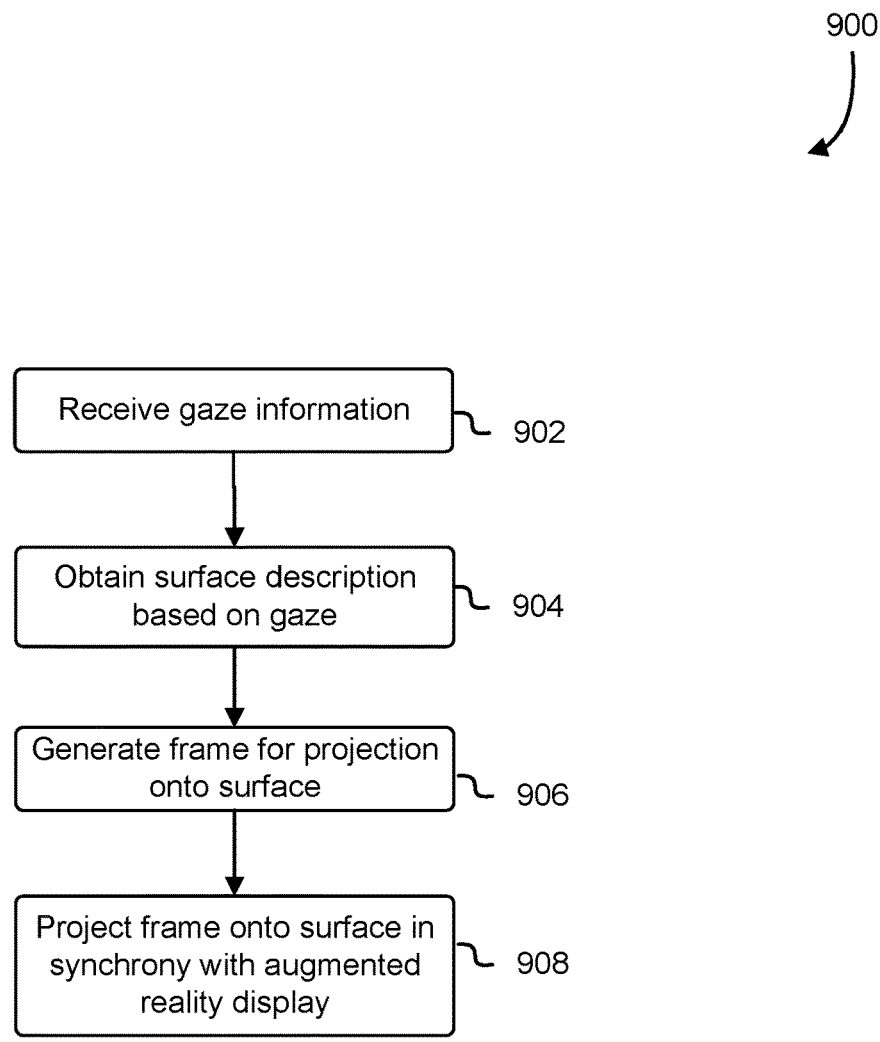
FIG. 9 is a flow diagram that illustrates an example process for generating a composite augmented reality scene, in accordance with an embodiment.

Embodiments of an improved augmented reality system may enhance a user's augmented reality experience using the techniques described in FIGS. 8 and 9. In particular, the user's experience may be enhanced by projecting content onto a surface so that it appears visible within the peripheral area 706 depicted in FIG. 7.

FIG. 8 illustrates an example 800 of an augmented reality room, in accordance with an embodiment. An augmented reality room 810, in an embodiment, comprises sensors 806. These may be sensors, such as those used in the virtual reality room 100 depicted in FIG. 1, which can obtain information usable to maintain a skeletal model of a participant. For example, the sensors may provide information permitting the maintenance of a skeletal or stick-figure model, or other data, indicative of a participant's current pose, including the participant's position and orientation. In particular, the sensors provide information which allows the system to track the gaze 802 of a participant 822. To this end, the skeletal model may include information indicative of the participant's eye position and orientation. From this information, the system calculates a viewed surface 820 region of the AR room 810.

In embodiments, a projector 804 then projects, onto the surface 820, content to fill the peripheral area 706 of the participant's 822 field-of-view. The projected content is visible outside of the edges of augmented reality goggles, glasses, or similar devices. For a typical participant, this content is viewed through the participant's peripheral vision, rather than through the lenses of the device.

In at least one embodiment, the projected content is adjusted to account for the angle of intersection between the surface and the participant's gaze angle. In at least one embodiment, the surface angle for this calculation is determined based on a known location of the projector, a known location of the surface, an obtained position of the participant, and an obtained gaze angle. The position may be obtained by tracking the participant's movement in the room, using the sensors also used to maintain data for the skeletal model. The gaze angle may be obtained via the skeletal model. The locations of the projector and surface may be known based on "blueprints" of the area in which the experience is being staged. The adjustment to the projected content may comprise skewing, rotating, or otherwise transforming the projected image to account for deformation of the image that may occur because of the angle of intersection between the projector and surface.

FIG. 9 is a flow diagram that illustrates an example process for generating a composite augmented reality scene, in accordance with an embodiment. Some or all of the process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). These computer systems may individually or collectively implement an augmented reality system, which may comprise components similar to those of the virtual reality system 200 that is depicted in FIG. 2.

At 902, the system receives gaze tracking information. As described herein, the system may maintain a skeletal model which includes data pertinent to eye position and orientation, from which a gaze angle can be derived. The gaze angle can be represented as a vector pointing from the participant's location to a point in the augmented reality room, where the vector is in alignment with the participant's gaze. By extending the vector to a surface within the room, and intersection point can be determined.

In at least one embodiment, the gaze information is obtained on a periodic bases. In at least one embodiment, the period is in accordance with the frame rate of an augmented reality device, such as once every $30^{th}$ of a second.

At 904, the system obtains a surface description based on the received gaze information. In some instances, the projected surface may encompass a wholly two-dimensional area, such as the floor of the room. In other instances, in some embodiments, the projected surface may encompass an area in three dimensions, such as a corner area of the room consisting of a floor and two walls. The surface description may also include data describing the angle at which the participant's gaze strikes the surface area. In at least one embodiment, blueprint information for the area is available to the system, and contains surface description data.

At 906, the system generates a frame for projection onto the surface. This process may consist of several phases. In an embodiment, the process first involves generating content for a composite augmented-reality scene 702 that comprises both an area viewed through lenses 704, and a peripheral area 706.

The content for the peripheral area may be derived from the content included in the lens area 704. For example, the participant might see, through the lens area 704, a mixture of physical and virtual objects. If one of the virtual objects emits simulated ambient light, this effect might be carried over into the peripheral area. In another example, if a virtual object is moving through the participant's field of view, it might be carried over into the peripheral area 706 as it moves.

After generating the content, the process continues by mapping the generated content for projection onto the surface. As noted above, the surface of the room is viewed at an angle based on the direction of the participant's gaze. The surface might also be a three-dimensional surface, or contain physical objects. The system can therefore map the generated content onto this surface, to eliminate distortions caused by the surface's shape and by the angle of intersection. In at least one embodiment, a transform is computed based on the angle of intersection and the surface geometry, and applied to the generated content prior to projection.

Then, at 908, the system projects the frame onto the surface in synchrony with the augmented reality display. For example, a new frame of content might be generated once every $30^{th}$ of a second, so that the content of the primary lens area is synchronized with the content of the peripheral area. Note, however, that embodiments may employ different frame rates for the lens and peripheral areas. Generally, the rates should be sufficiently synchronized to maintain the desired level of realism and impact.

In at least one embodiment, the projected image is adjusted to avoid interference between the projected image and what is viewed through the lenses of the device. The scene viewed through the lenses can be an augmented reality scene, and may therefore include a depiction of the surface area onto which the image is projected. This could potentially cause interference between what is intended to be viewed through the lenses, and what is intended to be viewed through peripheral vision. To account for this interference, at least one embodiment transforms the image, prior to projection, to include a "hole" that corresponds to the area that will be viewed through the lenses of the device. In another embodiment, the system does post-processing to remove unwanted interference. In another embodiment, portions of the projected image are intentionally included in the area viewed through the lenses. For example, an ambient lighting effect might be made to appear as if it originated in the non-peripheral area of the scene, and continues to the peripheral portion.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

The process just described may be applied to a single participant in an augmented reality experience. The process also may be applied to support multiple participants, when the relevant projection surfaces do not overlap. The process may also be applied, with various adaptations, when the projection surfaces do overlap. Averaged or "compromise" content might be generated for the overlapping areas. This may still provide a realistic effect, due in part to the manner in which peripheral vision is perceived by the user. Also, when the content contains ambient lighting, little compromise may be called for. In some cases, polarized filters, shutter glasses, or other techniques might be employed to enable each user to perceive different content on the projected surfaces, and thus eliminate interference that might be caused by overlapping projection surfaces.

In an example embodiment of a computer-implemented method, a system for providing an augmented reality experience is made to perform operations comprising obtaining pose information of a first subject within a physical area; maintaining a skeletal model of the first subject based at least in part on the pose information, the skeletal model comprising information indicative of gaze direction; generating an augmented reality scene based at least in part on a perspective of the first subject, the perspective based at least in part on the gaze direction; and projecting an image onto a portion of a surface within the physical area, the portion of the surface determined based at least in part on an intersection between the gaze direction and the surface.

In at least one embodiment, the computer-implemented method further comprises causing the augmented reality scene to be displayed on a device worn by the first subject. The augmented reality scene may therefore be viewed through the device's screen or lenses, and the image viewed through peripheral vision outside of the edges of the device.

In at least one embodiment, the computer-implemented method further comprises computing an angle of intersection between a projector and the surface, based at least in part on a vector indicative of the gaze direction and a representation of a geometry of the surface. The projected may be mounted at some known position in the room, and the surface and its corresponding geometry may be known a priori. The angle between projector and surface can therefore be calculated. In addition, a vector based on the gaze angle of the participant and the surface can also be computed, and used to compute a transformation of the image. For example, in at least one embodiment, the image is transformed to correct for distortion caused by projecting the image onto the surface at the angle of intersection. In at least one embodiment, the image is also transformed to correct for distortion caused by viewing the image at an angle. Accordingly, the image may be transformed based on the angle of intersection between the projector and surface, the angle of intersection between a vector representing the gaze angle, and the geometry of the surface.

In at least one embodiment, the skeletal model is based at least in part on orientation in space of a device worn by a user. For example, in at least one embodiment, the device tracks its position and orientation in space, and by doing so facilitates updates to the skeletal model. In some cases, the gaze angle of the participant can be determined directly from the position and orientation of the device.

In at least one embodiment, the image is generated to visually correlate with the augmented reality scene. For example, the contents of the image are such that they extend the content within the augmented reality scene into an area not covered by the lenses of the device.

Figure 10:
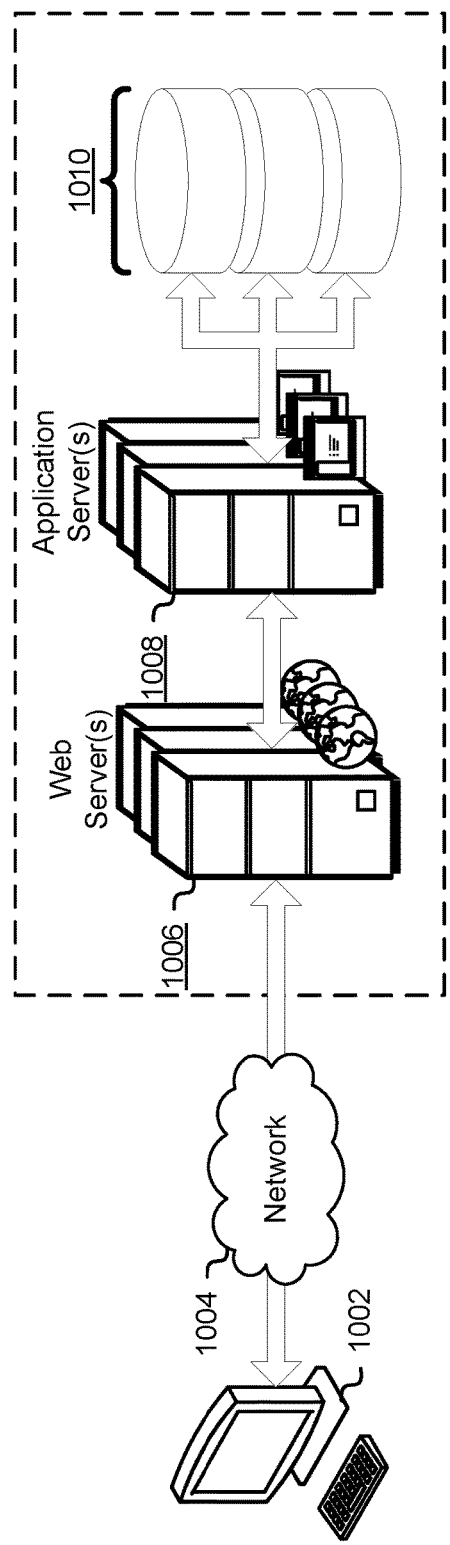
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 1000 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 10. Thus, the depiction in FIG. 10 should be taken as being illustrative in nature and not limiting to the scope of the disclosure.

The network 1004 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 1004 are well known and will not be discussed in detail. Communication over the network 1004 can be enabled by wired or wireless connections and combinations thereof. In an embodiment, the network 1004 includes the Internet and/or other publicly-addressable communications network, as the environment 1000 includes one or more web servers 1006 for receiving requests and serving content in response thereto, although for other networks an alternative device serving a similar purpose could be used as would be apparent to one of ordinary skill in the art.

The illustrative environment 1000 includes one or more application servers 1008 and data storage 1010. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 1008 can include any appropriate hardware, software and firmware for integrating with the data storage 1010 as needed to execute aspects of one or more applications for the electronic client device 1002, handling some or all of the data access and business logic for an application. The one or more application servers 1008 may provide access control services in cooperation with the data storage 1010 and is able to generate content including, text, graphics, audio, video, and/or other content usable to be provided to the user, which may be served to the user by the one or more web servers 1006 in the form of HyperText Markup Language (HTML), Extensible Markup Language (XML), JavaScript, Cascading Style Sheets (CSS), JavaScript Object Notation (JSON), and/or another appropriate client-side structured language. Content transferred to the electronic client device 1002 may be processed by the electronic client device 1002 to provide the content in one or more forms including forms that are perceptible to the user audibly, visually, and/or through other senses. The handling of all requests and responses, as well as the delivery of content between the electronic client device 1002 and the one or more application servers 1008, can be handled by the one or more web servers 1006 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 1010 can include several separate data tables, databases, data documents, dynamic data storage schemes, and/or other data storage mechanisms and media for storing data relating to a particular aspect of the present disclosure. For example, the data storage 1010 may include mechanisms for storing various types of data and user information, which can be used to serve content to the electronic client device 1002. The data storage 1010 also is shown to include a mechanism for storing log data, such as application logs, system logs, access logs, and/or various other event logs, which can be used for reporting, analysis, or other purposes. It should be understood that there can be many other aspects that may need to be stored in the data storage 1010, such as page image information and access rights information, which can be stored in any of the above listed mechanisms as appropriate or in additional mechanisms in the data storage 1010. The data storage 1010 is operable, through logic associated therewith, to receive instructions from the one or more application servers 1008 and obtain, update, or otherwise process data in response thereto. The one or more application servers 1008 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 1008.

In one embodiment, a user, through a device operated by the user, can submit a search request for a match to a particular search term. In this embodiment, the data storage 1010 might access the user information to verify the identity of the user and obtain information about items of that type. The information then can be returned to the user, such as in a results listing on a web page that the user is able to view via a browser on the electronic client device 1002. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 1004. These devices also can include virtual devices such as virtual machines, hypervisors, and other virtual devices capable of communicating via the network 1004.

Various embodiments of the present disclosure utilize the network 1004 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 1004 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 1006, the one or more web servers 1006 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 1000 can include a variety of data stores and other memory and storage media as discussed above. These can reside in a variety of locations, such as on a storage medium local to (and/or resident in) one or more of the computers or remote from any or all of the computers across the network 1004. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system, comprising:
   a first sensor to obtain image data of a first subject upon entry to an area;
   a second sensor to obtain pose information of the first subject during a period in which the first subject is within the area;
   at least one processor;
   a memory comprising instructions that, in response to execution by the at least one processor, cause the system to at least:
      generate a graphical asset based at least in part on the image data of the first subject, wherein the graphical asset corresponds to a portion of the first subject over which equipment is worn by the first subject;
      maintain a skeletal model of the first subject based at least in part on the pose information; and
      generate a virtual reality scene according to a perspective of a second subject in the area, the virtual reality scene comprising a representation of the first subject, the representation generated based at least in part on the skeletal model and the graphical asset.

2. The system of claim 1, wherein the area is configured as a virtual reality stage.

3. The system of claim 1, the memory comprising instructions that, in response to execution by the at least one processor, cause the system to at least:
   maintain a model of facial features of the first subject; and
   generate the representation of the first subject based at least in part on a current state of the model of facial features.

4. The system of claim 3, wherein the model of facial features is updated based at least in part on audio data comprising speech by the first subject.

5. The system of claim 3, wherein the model of facial features is updated based at least in part on the pose information.

6. The system of claim 1, wherein the image data is used to create a model of facial features of the first subject.

7. A computer-implemented method, comprising:
   generating a graphical asset based at least in part on image data of a first subject, the image data obtained by a first sensor;
   maintaining a skeletal model of the first subject based at least in part on pose information, the pose information obtained by a second sensor; and
   generating a virtual reality scene comprising a representation of the first subject in an area, the representation generated based at least in part on the skeletal model and the graphical asset, the virtual reality scene generated according to a perspective of a second subject in the area, wherein the graphical asset depicts a portion of the first subject over which equipment is being worn by the first subject.

8. The method of claim 7, wherein the first sensor obtains the image data prior to commencement of a virtual reality experience.

9. The method of claim 7, further comprising:
   maintaining a model of facial features of the first subject; and
   generating the representation of the first subject based at least in part on a current state of the model of facial features.

10. The method of claim 9, wherein the graphical asset is adjusted using the model of facial features and incorporated into the representation of the first subject.

11. The method of claim 9, wherein the model of facial features is maintained based at least in part on speech by the first subject.

12. The method of claim 9, wherein the model of facial features is maintained based at least in part on the pose information.

13. The method of claim 7, wherein the graphical asset comprises facial identity data.

14. The computer-implemented method of claim 7, wherein the image data is used to create a model of facial features of the first subject, and the representation is based, at least in part, on the model of facial features.

15. A non-transitory computer-readable storage medium having stored thereon instructions that, in response to execution by at least one processor of a computing device, cause the computing device to at least:
   generate a graphical asset based at least in part on image data of a first subject, the image data obtained by a first sensor;
   update a skeletal model of the first subject based at least in part on pose information, the pose information obtained by a second sensor; and
   generate a virtual reality scene comprising a representation of the first subject in an area, the virtual reality scene generated in accordance with a perspective of a second subject in the area, the representation generated based at least in part on the skeletal model and the graphical asset, the representation generated using the graphical asset and corresponding to a portion of the first subject over which equipment is worn by the first subject.

16. The non-transitory computer-readable storage medium of claim 15, wherein, wherein the first sensor obtains the image data prior to commencement of a virtual reality experience.

17. The non-transitory computer-readable storage medium of claim 15, wherein the representation of the first subject is generated based at least in part on a current state of an animation model of a face.

18. The non-transitory computer-readable storage medium of claim 15, having stored thereon instructions that, in response to execution by at least one processor of the computing device, cause the computing device to at least:
   generate a partial representation of the first subject based at least in part on the skeletal model; and
   generate the representation of the first subject based at least in part on the partial representation, the graphical asset, and an animation model of a face.

19. The non-transitory computer-readable storage medium of claim 18, wherein the animation model is synchronized with speech of the first subject.

20. The non-transitory computer-readable storage medium of claim 15, wherein the image data is used to create a model of facial features of the first subject.

21. A computer-implemented method, comprising:
   obtaining pose information of a first subject within a physical area;
   maintaining a skeletal model of the first subject based at least in part on the pose information, the skeletal model comprising information indicative of gaze direction;
   generating an augmented reality scene based at least in part on a perspective of the first subject, the perspective based at least in part on the gaze direction; and
   projecting an image onto a portion of a surface within the physical area, the portion of the surface determined based at least in part on an intersection between the gaze direction and the surface.

22. The computer-implemented method of claim 21, further comprising:
   causing the augmented reality scene to be displayed on a device worn by the first subject.

23. The computer-implemented method of claim 22, wherein the projected image is viewable by peripheral vision of the first subject.

24. The computer-implemented method of claim 21 further comprising:
   computing an angle of intersection between a projector and the surface, based at least in part on a vector indicative of the gaze direction and a representation of a geometry of the surface.

25. The computer-implemented method of claim 24, wherein the image is transformed to correct distortion caused by projecting the image onto the surface at the angle of intersection.

26. The computer-implemented method of claim 21, wherein the skeletal model is based at least in part on orientation in space of a device worn by a user.

27. The computer-implemented method of claim 21, wherein the image is generated to visually correlate with the augmented reality scene.

* * * * *